United States Patent [19]
Charlebois

[11] Patent Number: 5,800,752
[45] Date of Patent: Sep. 1, 1998

[54] PROCESS FOR MANUFACTURE OF POLYMER COMPOSITE PRODUCTS

[75] Inventor: Raymond Charlebois, Quebec, Canada

[73] Assignee: Charlebois Technologies Inc., Quebec, Canada

[21] Appl. No.: 584,821

[22] Filed: Jan. 11, 1996

[51] Int. Cl.⁶ .................................................. B29C 43/00
[52] U.S. Cl. ................................. 264/71; 264/DIG. 53; 264/DIG. 69
[58] Field of Search .......................... 264/71, DIG. 43, 264/DIG. 69, DIG. 80, DIG. 53

[56] References Cited

U.S. PATENT DOCUMENTS

| | | | |
|---|---|---|---|
| 3,397,429 | 8/1968 | Zauitz et al. | 264/71 |
| 3,450,808 | 6/1969 | Roberts | 264/71 |
| 3,712,785 | 1/1973 | Hirt et al. | 264/71 |
| 3,856,054 | 12/1974 | Steinberg et al. | 264/71 |
| 4,014,965 | 3/1977 | Stube et al. | 264/71 |
| 4,105,729 | 8/1978 | Helmrich et al. | 264/71 |
| 4,117,060 | 9/1978 | Murray | 264/82 |
| 4,128,524 | 12/1978 | Barnett et al. | |
| 4,204,820 | 5/1980 | Toncelli | 425/89 |
| 4,238,177 | 12/1980 | Crile et al. | 264/71 |
| 4,267,402 | 5/1981 | Reighter | 264/71 |
| 4,346,050 | 8/1982 | Trent et al. | 264/71 |
| 4,588,420 | 5/1986 | Charvat | 264/71 |
| 4,595,626 | 6/1986 | Brubaker et al. | 264/69 X |
| 4,696,839 | 9/1987 | Renker et al. | 264/71 |
| 4,698,010 | 10/1987 | Toncelli | 264/71 |
| 4,999,396 | 3/1991 | Farrell . | |
| 5,061,427 | 10/1991 | Hirzel | 264/219 |
| 5,076,986 | 12/1991 | Delvaux et al. . | |
| 5,264,168 | 11/1993 | Toncelli | 264/63 |
| 5,393,807 | 2/1995 | Farrell . | |

FOREIGN PATENT DOCUMENTS

| 1092743 | 12/1980 | Canada | 264/71 |
|---|---|---|---|

OTHER PUBLICATIONS

Tassone, P. et al, Procedure for Fast Curing at Thigh Temperature of Polyester Resins Used as Binding in the Production of Polymer Concrete Slabs, Research & Development Dept., Breton SpA, Italy, Abstract, pp. 351–356, Jul. 1995.

Primary Examiner—Karen Aftergut
Attorney, Agent, or Firm—Kurt D. Van Tassel; Deborah G. VandenHoff; Van Tassel & Associates

[57] ABSTRACT

Polymer composite products, including products made of polymer concrete, reinforced polymer concrete and reinforced plastics, such as bulk molding compound, sheet molding compound, mineral molding compound and advanced molding compound systems, are produced by the simultaneous application of vibration, heat and pressure to a mixture of filler and polymeric binder. The simultaneous application of vibration, heat and pressure provides a protective layer of polymerized binder that protects the surfaces of the mold and provides products that are substantially free of curling, cracking or voids. The process of the present invention substantially reduces the time required to cure polymer composite products.

16 Claims, 2 Drawing Sheets

PROCESS FOR MANUFACTURE OF POLYMER COMPOSITE PRODUCTS

FIELD OF THE INVENTION

The present invention relates to the field of polymer composites and, in particular, to a process for the manufacture of polymer composite products.

BACKGROUND OF THE INVENTION

The term "polymer composite" used herein will be understood to include polymer concrete, reinforced polymer concrete and reinforced plastics, such as bulk molding compound, sheet molding compound, mineral molding compound and advanced molding compound systems.

Polymer concrete is formed from a mixture of aggregate and a polymeric binder. Aggregate particles, for example sand, gravel and crushed stone, are bound together by polymeric binder when cured. Advantages of polymer concrete include faster curing rates and superior properties, such as chemical and abrasion resistance, especially as compared with conventional concrete products formed of Portland cement, water, sand and aggregate. Furthermore, polymer concrete products tend to be impermeable to water and corrosive chemicals, such as deicing salts. Applications include pavers, flower boxes, garden furniture, counter tops, floor slabs and tiles, roof tiles, fascia panels for buildings, wall-cladding, electric cable trenches and trench covers, electrical insulators, grating, duck-boards, and drain, sewer and other pipes.

In the reinforced plastics industry, compression molding of plastics and elastomers involves the application of pressure to a material placed in a heated mold for a specified curing period. The use of compression molding has expanded over the years especially in the development of new materials, including reinforced plastics. One conventional molding system is the BMC (bulk molding compound) system wherein a combination of reinforcing fibres and fillers, such as wood flour, minerals and cellulose, are mixed with a resin, placed in a mold at 300° to 400° F. and then compressed at about 500 psi. Typical applications include washtubs, tray equipment housings and electrical components.

Another reinforced plastic is known as a SMC (sheet molding compound) system which uses a combination of pre-impregnated resin, catalysts and glass fibre reinforcements cut into part size sheets. The sheets are placed in hot molds, usually 300° to 400° F., and molded at 1000 to 2000 psi. Products such as automotive body panels, bathtubs, septic tanks and outdoor electrical components are made in this process. The MMC (mineral molding compound) system uses a mineral filler to provide a stone aspect and improved scratch resistance to the reinforced plastic. A specific proportion of soft filler (Mohs' 3) and hard filler (Mohs' 7) is chosen to obtain an acceptable compromise between maximum scratch-resistance of the finished product and minimum abrasion of the mold. Applications include counter tops.

In the reinforced plastics industry, the upper limit of fillers and reinforcing material is about 60% by volume, the content of fillers representing up to 5%.

As in the manufacture of reinforced plastics, polymer concrete products are manufactured by mixing a polymer binder with aggregate and then curing the mixture by the application of heat and/or by the introduction of chemical agents to form a hardened polymer concrete product wherein the aggregate is fused by polymerized binder.

In one conventional technique, a mixture of aggregate and binder is subjected to vibration to distribute the binder and to pack the aggregate in a close relationship. The vibrated mixture is then subjected to heat to accelerate the curing process.

A steel mold is first treated with a release agent, for example a teflon solution followed by polyvinyl alcohol. A gel coat resin is then applied to the surfaces of the mold and allowed to cure. The cured gel coat resin enhances the finish on the surfaces of the polymer concrete product. A mixture of aggregate and polymeric binder is then distributed in the mold heated to a temperature in the range of from 160° to 170° F. Vibration is applied and the mixture is then allowed to cure for about 1 to 1.5 hours at a temperature in the range of from 160° to 170° F. It will be appreciated by those skilled in the art that the curing step is the rate-limiting step. Moreover, there are problems of voids in the cured concrete and of cracking and curling of the product due to the high shrinkage of the binder.

U.S. Pat. No. 4,346,050 (Trent and Charlebois, Aug. 24, 1982) describes a process for preparation of polymer bonded concrete wherein a mixture of aggregate and binder is subjected to intense vibration for a period of from 15 to 30 minutes to cause segregation of binder from aggregate so that any excess liquid binder forms a layer on the upper surface of the cast mixture. The vibrated mixture is then subjected to a curing step at a maximum temperature of 170° .F to minimize boiling, cracking or curling. Once the product is removed from the mold, the product may be subjected to a post-curing step, for example for one hour, in an oven to achieve a completely cured product.

While curling and cracking is reduced, as compared to the previous process, there is still some cracking and curling which occurs. Moreover, pretreatment of the molds with polyvinyl alcohol is necessary to prevent abrasion of the mold surfaces due to the increased length of the vibration cycle. It will be appreciated by those skilled in the art that the pre-treatment of the molds is labour-intensive and time-consuming and requires the use of costly materials. Other disadvantages of excessive vibration are noise pollution and rapid deterioration of the mold structure. Furthermore, only resins having low to medium reactivity can be used since the amount of cracking or curling increases with the speed of polymerization.

U.S. Pat. No. 4,117,060 (Murray, Sep. 26, 1978) describes a method for the manufacture of concrete products wherein curing of the concrete mixture is accelerated by injection of carbon dioxide gas with simultaneous compression of the mixture and gas until an advanced state of cure is obtained. The addition of carbon dioxide gas causes an exothermic reaction which increases the temperature by about 80° F. Carbon dioxide is an essential reactant of the process to raise the temperature which cannot be achieved by the addition of any other gas or by application of heat alone. The surfaces of the mold are coated with rubber to prevent a heat sink caused by metallic molds and to protect the surfaces of the mold.

U.S. Pat. No. 4,204,820 (Toncelli, May 27, 1980) discloses a method for the formation of resin-bonded grit slabs with combined vibration and pressure action in an airless environment. A concrete mixture is distributed within a frame on a cardboard sheet and transported on a conveyor line beneath another cardboard sheet to a press including a head on which a vibrator is mounted. The head is driven downward to compress the mixture between the two cardboard sheets. Cardboard is used to protect the surfaces of the mold and the conveyor and to minimize adherence. The cardboard sheets are cut around the concrete and the slab is transported to heating plates in a stack in a drying oven wherein the slabs are sandwiched between two contact plates heated to 80° C. for about 25 minutes. The cardboard sheets are fused to the surfaces of the cured concrete and must be removed in a finishing step by sand-blasting and/or grinding.

U.S. Pat. No. 5,264,168 (Toncelli, Nov. 23, 1993) relates to a process for manufacture of ceramic material wherein the mixture is distributed onto a molding support and subjected to a vacuum. The distributed mixture is then subjected to simultaneous application of vibration and pressing action of at least 0.5 kg/cm$^2$ to mold the mixture. Once the molding step is completed, the mixture is dried at a temperature of about 130° C. for at least two hours and then fired at a temperature between 1000° and 1300° C.

Tassone and Toncelli ("Procedure for fast curing at high temperature of polyester resins used as binder in the production of polymer concrete slabs" *Proc VIII International Congress on Polymers in Concrete* Oostende, Belgium; 351–356; Jul. 3–5; 1995) describe a process wherein polymer concrete is first subjected to vibrocompaction under vacuum and then to a curing step in a high-temperature pressurized kiln.

One disadvantage of the known methods is the tendency of the products to crack or curl due to high shrinkage on curing of the polymeric binder. In all of the processes described above, the curing step is still the rate-limiting step. Furthermore, the processes all involve a number of steps to achieve the desired product.

Another disadvantage of conventional processes is the requirement for a coating, for example polyvinyl alcohol or cardboard, to protect the surfaces of the mold from abrasion or adherence. Accordingly, additional steps are required to apply the coating and/or cardboard and to treat the cured product. In particular, cardboard must be removed from the cured product in a finishing step by sand-blasting and/or grinding.

The curing time could be reduced by increasing the temperature; however, it has been found that increasing the temperature above 170° F. causes boiling of the resin, resulting in voids and cracks in the cured polymer concrete product. Furthermore, there is excessive evaporation of volatile binder components at elevated temperatures, adversely affecting the quality of the polymer concrete.

It is therefore desirable to have a process for the manufacture of polymer composite products in which the curing time is reduced substantially. A process wherein abrasion of molds is reduced without the requirement for polyvinyl alcohol or cardboard, the concentration and hardness of fillers can be increased and curling, cracking and voids are minimized would also be desirable.

It is an object of the present invention to provide a process for the manufacture of polymer composite products wherein the time required for curing is reduced.

It is another object of the present invention to provide a one-step process for the manufacture of polymer composite products.

It is a further object of the present invention to provide a process wherein curling and cracking of polymer composite products is minimized.

SUMMARY OF THE INVENTION

According to one aspect of the present invention, there is provided a process for the manufacture of a polymer composite product, comprising the steps of distributing a predetermined amount of a mixture of filler and polymeric binder in a mold; curing the mixture by simultaneous application of heat, pressure and vibration; the mixture being heated, pressurized and vibrated in the curing step sufficient to (a) form a skin of cured polymer around the mixture of filler and polymeric binder; (b) minimize boiling and evaporation of the polymeric binder; and (c) evenly distribute the filler in the mold; such that the polymer composite product is substantially void-free.

The product is substantially void-free because the polymeric binder is evenly distributed, air pockets are minimized and evaporation and boiling of uncured polymeric binder is minimized by the simultaneous application of heat, vibration and pressure.

BRIEF DESCRIPTION OF THE DRAWINGS

In drawings which illustrate an embodiment of the present invention.

DETAILED DESCRIPTION OF THE PREFERRED EMBODIMENTS

Figure 1:
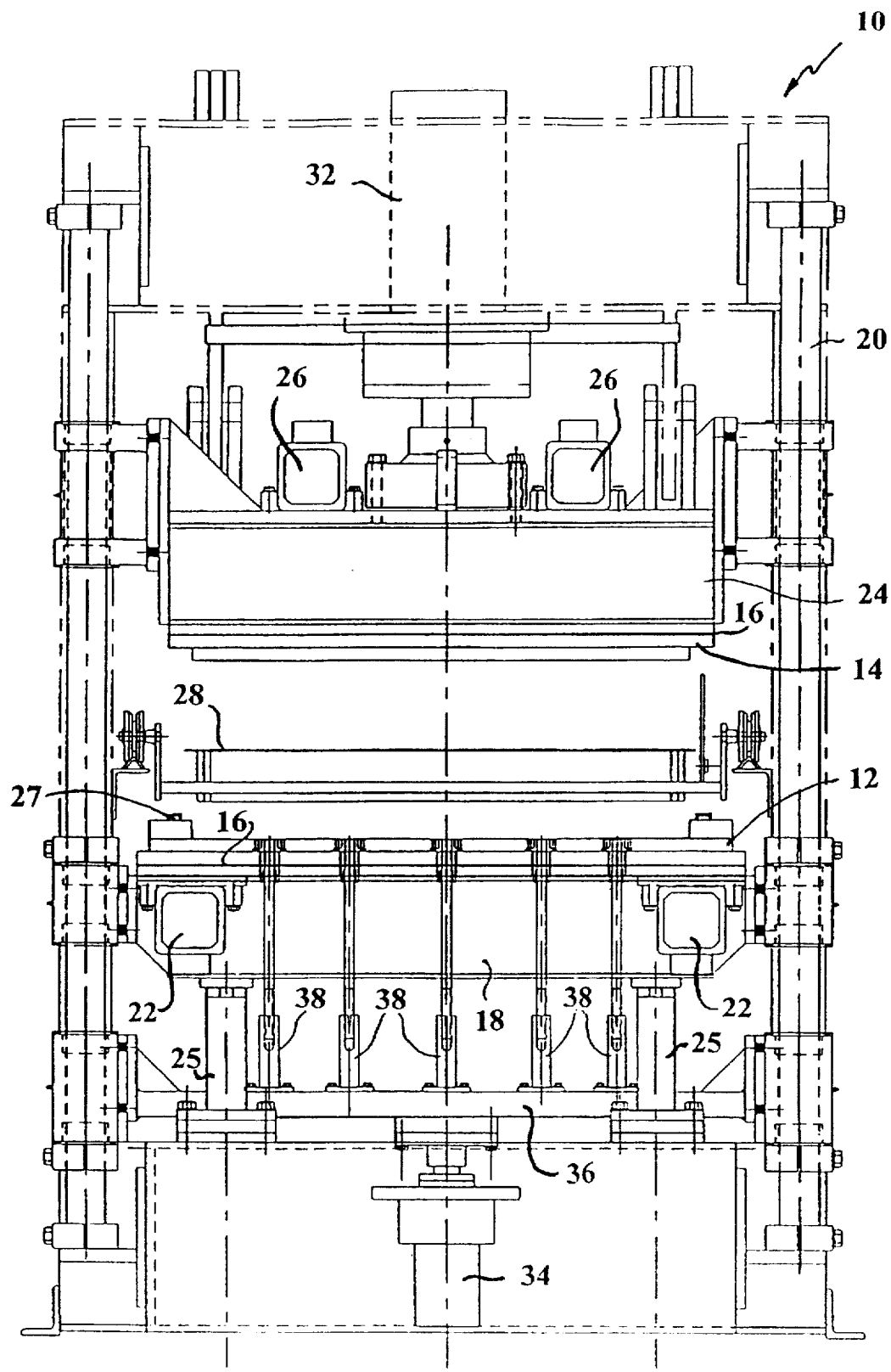
FIG. 1 is a front elevational view of an apparatus according to the present invention.

The present invention is applicable to a variety of polymer composites including polymer concrete, reinforced polymer concrete and reinforced plastics produced, for example by bulk molding compound, sheet molding compound, mineral molding compound and advanced molding compound systems. These composites are similar in that aggregate and/or fillers are fused by a polymeric binder. As used herein, the term "filler" will be understood to include aggregate, pigments, reinforcing material and the like. The present invention is particularly applicable to the manufacture of polymer composites containing highly abrasive fillers, for example, fillers having a hardness of up to about Mohs' 8.

In accordance with the present invention, polymer composite products are manufactured in a one-step process. Filler and polymeric binder is mixed and distributed in a mold and then subjected to simultaneous application of vibration, heat and pressure to cause the polymer binder to cure rapidly. In the process of the present invention, a substantially tack-free and void-free polymerized protective layer is formed around the unpolymerized binder and filler, thereby protecting the surfaces of the mold from abrasion by the filler. Thus, in accordance with the present invention, the wear on, the mold is reduced substantially, thereby increasing the working life of the mold. The pressure also minimizes boiling and evaporation of volatile binder components. The cost of lost binder is therefore minimized and the cured product is substantially free of voids, cracks and curl. The cured product also exhibits improved physical and chemical characteristics, such as scratch resistance, flexural, impact and compression strength, and water absorption.

Vibration of the mixture causes the filler to be evenly distributed throughout the mold. Filler particles are vibrated into a closely packed relationship to produce a dense, substantially void-free product.

The frequency and the time required to vibrate the mixture is dependent on the thickness of the piece, the formulation of the mixture, the concentration of binder, and the size and concentration of filler. Preferably, the frequency and time of vibration is selected such that vibration does not cause separation of coarser filler materials from finer filler materials and the binder.

In conventional processes for the manufacture of polymer concrete products, polymerization is initiated by subjecting the mixture to a temperature of about 130° F. While the curing step is the rate-limiting step, those skilled in the art have not increased the temperature to accelerate curing because the polymeric binder tends to boil, causing air bubbles in the cured product and resulting in loss of binder due to evaporation. High temperatures also cause excessive cracking and curling in slabs produced by conventional processes. In the process of the present invention, the mixture can be subjected to a higher temperature without the problems of the prior art because of the simultaneous application of heat, pressure and vibration.

If the temperature is too low, the uncured mixture tends to abrade and dilute wax mold release agent applied to the mold surfaces before a protective skin of cured polymer is formed. The cured product will then tend to stick to the abraded surfaces of the mold.

If the temperature is too high, the polymeric binder will cure before the vibration and pressure cycle begins. Therefore, the temperature of the mold must be selected in view of the type and reactivity of the binder, the type and reactivity of the catalyst system and the thickness of the product. In polymer concrete applications, the temperature is preferably greater than 170° F. and more preferably in the range of from about 200° to 275° F. In reinforced plastic applications, the temperature is preferably in the range of from about 200° to 400° F.

To minimize cracking, curling, boiling and evaporation of polymer components due to the increased temperature, the mixture is subjected to a pressure greater than about 100 psi, simultaneously while the mixture is being heated and vibrated. The exact pressure is dependent on the polymer composite mixture being used and the degree of vibration applied. The minimum pressure for this process is the pressure necessary to minimize boiling and evaporation of the polymeric binder. For example, in polymer concrete applications, the pressure is preferably in the range of from about 50 to 400 psi, more preferably in the range of from about 100 to 200 psi. In reinforced plastics applications, the pressure is preferably in the range of from about 50 to 500 psi, although the upper limit of pressure may increase to a pressure as high as 1000 to 2000 psi. The pressure may be applied by a top platen or by vacuum.

If the pressure is too low, air pockets may remain in the mixture so that the resultant polymer composite product has undesirable voids. Application of pressure also assists in even distribution of binder so that pockets of uncured binder are "squeezed" out to be more evenly distributed around the surrounding filler. At lower pressures, binder may not be evenly distributed. At pressures greater than 400 psi, there may be no further improvement in the resultant product to warrant the added cost.

With the simultaneous application of heat, pressure and vibration, a polymeric film is formed around the polymer composite product which inhibits evaporation and boiling of the uncured polymer. The polymeric film also serves to protect the surfaces of the mold from abrasion by the filler. The protective film obviates the requirement for special release paper or film to protect the mold surfaces and for gel coat resin which is used in conventional processes to provide a better surface appearance. The time, labour and materials costs associated with the application of these layers also represent significant savings over the conventional processes. Furthermore, no post-finishing, other than to remove any flashing, is required. For example, in conventional processes, when cardboard is used to protect the surfaces of the mold from abrasion and/or to minimize cracking and/or curling of the product during curing, the paper must be removed in a finishing step by sandblasting and/or grinding the cured product.

Suitable fillers include mineral, metallic and non-metallic fillers. Examples of mineral fillers include a wide variety of aggregates and sands, calcium carbonate, quartz, granite, feldspar, marble, quartzite, fumed silica, clay, fly ash, cement (an example of a reactive filler which can be added to achieve certain properties), broken glass, glass beads and glass spheres. Metallic fillers include steel grit, steel bar, steel mesh, aluminum grit and carbides. Examples of non-metallic fillers include plastic beads (for example, made of recycled plastic), pelletized rubber, wood chips, sawdust and paper laminates. Other materials, such as titanium dioxide, carbon black and iron oxide, may be added for pigmentation.

Reinforcing materials to increase the flexural, tensile and/or impact strength may also be added. Suitable reinforcing materials include steel, plastic, glass, carbon and the like. Reinforcing material may be added in the form of fibres, sheets and/or rods. For example, glass fibres may be added with other fillers, in a layer in the base of the mold and/or in a layer on top of the filler/polymer mixture in the mold. Glass reinforcement may also be provided as sheet-like material, such as roving or mesh, in the base of the mold and/or on top of the filler/polymer mixture before application of pressure and vibration. Glass fibre rods may also be laid in the base of the mold, for example with spacers formed of cured polymer, prior to addition of the filler/polymer mixture.

Suitable polymeric binders include substantially any thermosetting resin. The binder may be formed of a polymer, a mixture of polymers (for example, polyester and urethane), monomers, and mixtures of monomers and polymers. Examples of suitable polymers include polyester, vinyl ester, epoxy, phenolic resin, urethane and mixtures thereof. Examples of monomers for the polymeric binder include α, β-ethylenically unsaturated monomers, i.e. styrene and styrene derivatives, such as lower alkyl substituted styrenes such as α-methyl styrene and vinyl toluene, divinyl benzene, $Cl_{1-8}$ alkyl esters of acrylic and methacrylic acids, such as methyl acrylate, ethyl acrylate, isopropyl acrylate, butyl acrylate, 2-ethylhexyl acrylate, methyl methacrylate, ethyl methacrylate, isopropyl methacrylate and butyl methacrylate, phenols, furans and the like. These monomers may be used alone or in combination and the preferred monomers, particularly from the point of view of cost, are styrene, methyl methacrylate and butyl acrylate.

In accordance with the present invention, it is possible to use highly reactive binders such as vinyl ester. As previously mentioned, known processes were limited to low to medium reactive binders since highly reactive binders cured quickly and caused high shrinkage of the binder, resulting in curling and/or cracking of the cured product. Shrinkage is minimized in the process of the present invention by the simultaneous application of vibration, heat and pressure.

The binder may also include a coupling agent, such as silane, to assist in adhesion between the aggregate and binder. This is especially useful for hard fillers. For example, a polyester binder will bind more effectively to quartz if a silane coupling agent is added to the mixture. A coupling agent may also be used to pretreat fillers, for example glass fibres, prior to addition of binder.

It will be understood that the components of polymer composites listed above are intended as examples only and are not intended to limit the scope of the present invention. The process of the present invention is not limited in the types of binder, filler or other components.

Figure 2:
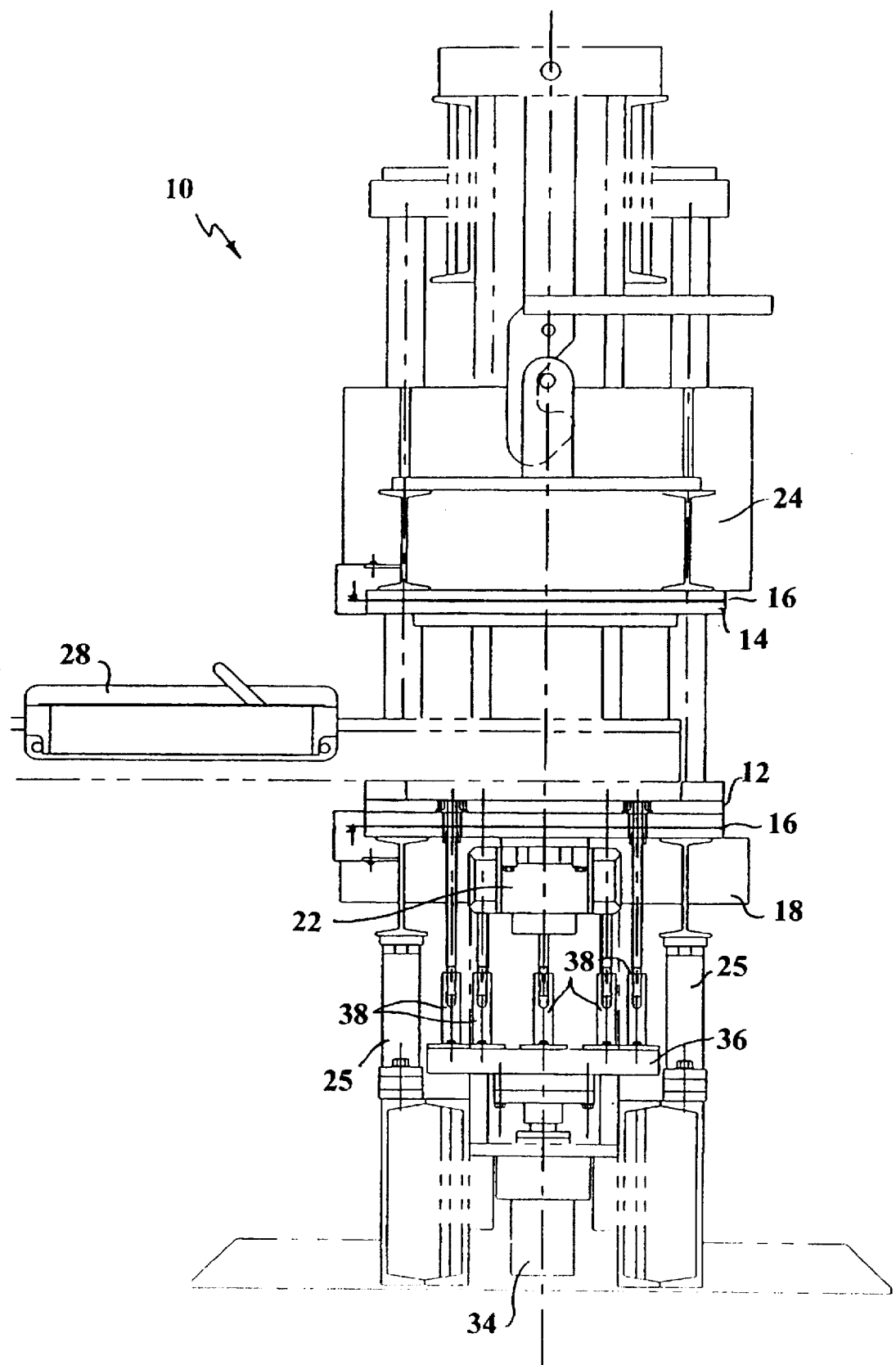
FIG. 2 is a side elevational view of the apparatus of FIG. 1.

An apparatus 10 for the process of the present invention is illustrated in FIGS. 1 and 2. The apparatus 10 has a two-part mold formed of a bottom mold portion 12 and a top mold portion 14. The bottom mold portion 12 and the top mold portion 14 are provided with heating elements 16. The bottom mold portion 12 is supported on a bottom platen 18 provided with a pair of vibrators 22. The bottom platen 18 is supported by a frame 20 and support pillars 25.

The top mold portion 14 is supported in the frame 20 above the bottom mold portion 12. The top mold portion 14 is mounted on a top platen 24 which is moveable on the frame 20. Preferably, a pair of vibrators 26 are mounted on the top platen 24 to vibrate the top mold portion 14. The degree of vibration is selected such that vibration does not cause separation of coarser filler materials from finer filler materials and the binder. Preferably, the bottom mold portion 12 is provided with spacers 27 to allow excess binder to flash out of the mold between the top mold portion 14 and the bottom mold portion 12.

In operation, the bottom mold portion 12 and the top mold portion 14 are preheated using the heating elements 16. A mixture of filler and binder is fed into the bottom mold portion 12 using a material feeder 28 and distributed manually and/or by vibration from the vibrators 22. Preferably, the mixture of filler and binder is distributed while vibrators 22 are turned on. It will be appreciated by those skilled in the art that the distribution of the mixture of filler and binder into the mold may be automated to reduce the time and labour associated with this step.

The top mold portion 14 is lowered into position on the bottom mold portion 12 by lowering the top platen 24 on the frame 20. Pressure is applied to the top mold portion 14 with a compression cylinder 32 and the vibrators 26 are used to vibrate the top mold portion 14. Vibration of the top mold portion 14 assists in the even distribution of binder and filler throughout the mold. It will be appreciated by those skilled in the art that the amount of pressure required to compact the mixture in the bottom mold portion 12 can be reduced with increased vibration of the top mold portion 14. Conversely, less vibration is required with higher pressures. It is believed that the maximum vibration which can be applied to the top mold portion 12 is limited only by the structure.

Once the curing step is completed, the pressure on the top mold portion 14 is discontinued and the top platen 24 is raised above the bottom mold portion 12. The cured polymer composite product is removed from the bottom mold portion 12 by a demolding cylinder 34 acting on a demolding platen 36 having ejector pins 38. It has been found that the cured product is occasionally removed from the bottom mold portion 12 when the top mold portion 14 is raised. It is therefore preferable to provide ejector pins on the top mold portion 14 as well.

In accordance with the present invention, the time required for curing is reduced substantially, allowing the process to become more continuous. The resultant products have a smoother finish on the surfaces and problems of curling and cracking are minimized.

The process of the present invention also allows the binder content to be reduced to about 5%, thereby reducing the cost of the polymer concrete without adversely affecting the mechanical properties of the cured product.

Described below is one example of the manufacture of a glass reinforced polymer concrete slab in accordance with the process of the present invention. The example is for illustrative purposes only and is not intended to limit the scope of the invention defined by the claims below. The quantity and type of mineral fillers, polymer binder, initiator and reinforcing material is dependent on the desired results.

EXAMPLE

A polymer and aggregate mixture was prepared according to the formulation in Table I for the manufacture of a glass fibre reinforced 2'×3'×¾" slab of polymer concrete.

TABLE I

| Component | | Weight % |
| --- | --- | --- |
| Mineral Filler | | |
| Aggregate | ⅛–⅜" granitic river gravel | 43.89 |
| Sand | Barco S2X ™ | 34.62 |
| Silica Flour | Silcocil 290M ™ | 13.92 |
| Colorants | Titanium Dioxide | 0.43 |
| | Carbon Black | 0.05 |
| Total Minerals | | 92.91 |
| Binder | | |
| Polymer | Derakane ™ vinyl ester | 4.33 |
| Monomer | Methyl methacrylate | 2.71 |
| Coupling agent | A-174 ™ Silane | 0.025 |
| Total Binder | | 7.065 |
| Initiator | | |
| Catalyst | Perkadox ™ | 0.025 |

The mineral fillers were added to a conventional concrete mixer and a pre-blended mixture of binder and initiator was added to the filler in the mixer.

The bottom mold was preheated to a temperature of about 210° F. and the top mold was preheated to a temperature of about 240° F. The temperature of the bottom mold was preheated to a lower temperature to minimize curing of the mixture while being distributed in the mold, since the distribution step was performed manually. The temperature of the bottom mold could be increased with an automated distribution step. The molds were then treated with a water-based wax release agent. The wax pretreatment of the molds is usually required only on start-up and a number of slabs can be made without re-treating the mold.

A 2'×3' glass fibre sheet (4 oz/sq.yd., ¼"×¼" grid) was placed in the bottom mold. 54 lb of the aggregate and binder mixture of Table I were fed into bottom mold on top of the glass fibre sheet. Two vibrators on the bottom (3450 rpm, 750 W each) were then turned on to assist in the distribution of aggregate and binder mixture in the mold on top of the glass fibre sheet. A 2'×3' glass fibre sheet (24 oz/sq.yd., ¼"×¼" grid) was then placed on top of the mixture. The distribution step was completed as quickly as possible to minimize curing in the bottom mold during this step since the distribution step in the example was performed manually. Preferably, the step is conducted in less than 40 seconds.

The top of the mold was then put into position over the mixture. When the top mold contacted the mixture, the two vibrators (3450 rpm, 750 W each) on the top mold were started and the mixture was simultaneously subjected to a pressure of 160 psi. After 30 seconds, the mixture was compacted sufficiently, as indicated by the contact of the spacers with the upper edge of the top mold portion, and the vibrators were turned off while pressure and heat were maintained for 3 minutes.

The resultant glass fibre reinforced 2'×3'×¾" slab of polymer concrete was removed from the mold using the ejector pins. The polymer concrete slab had smooth finishes on all sides and required no post-finishing step. The mold release wax layer was not abraded by the aggregate and the mold could be used to prepare the next slab.

Changes and modifications in the specifically described embodiments can be carried out without departing from the scope of the invention which is intended to be limited only by the scope of the appended claims.

I claim:

1. A process for the manufacture of a polymer composite product, comprising the steps of distributing a predetermined amount of a mixture of filler and polymeric binder in a mold; curing the mixture by simultaneous application of heat, pressure and vibration; the mixture being heated, pressurized and vibrated in the curing step sufficient to: (a) form a skin of cured polymer around the mixture of filler and polymeric binder; (b) minimize boiling and evaporation of the polymeric binder; and (c) evenly distribute the filler in the mold such that the formed polymer composite product is substantially void-free.

2. A process according to claim 1, wherein vibration is applied during the distributing step.

3. A process according to claim 1, wherein the mold is preheated prior to the distributing step.

4. A process according to claim 1, wherein vibration is discontinued while heat and pressure are maintained.

5. A process according to claim 1, wherein the mixture is heated to a temperature in a range of from about 200° to 400° F.

6. A process according to claim 1, wherein the mixture is heated to a temperature in a range of from about 200° to 275° F.

7. A process according to claim 1, wherein the pressure is in a range of from about 50 to 500 psi.

8. A process according to claim 1, wherein the pressure is in a range of from about 50 to 400 psi.

9. A process according to claim 1, wherein the pressure is in a range of from 100 to 200 psi.

10. A process according to claim 1, wherein the filler comprises an aggregate selected from the group consisting of calcium carbonate, quartz, granite, feldspar, marble, quartzite, fumed silica, sand, clay, fly ash, cement, broken glass, glass beads, glass spheres, steel grit, aluminum grit, carbides, plastic beads, pelletized rubber, wood chips, sawdust and paper laminates.

11. A process according to claim 1, wherein the filler comprises a pigment selected from the group consisting of titanium dioxide, carbon black and iron oxide.

12. A process according to claim 1, wherein the filler comprises reinforcing material selected from the group consisting of steel, plastic, glass and carbon.

13. A process according to claim 12, wherein the reinforcing material is glass fibers.

14. A process according to claim 1, wherein a reinforcing sheet is disposed in the mold prior to distributing the mixture of filler and polymeric binder in the mold.

15. A process according to claim 1, wherein a reinforcing sheet is disposed on top of the distributed mixture of filler and polymeric binder before subjecting the mixture to pressure.

16. A process according to claim 1, wherein the mixture is heated to a temperature greater than 170° F.

* * * * *

UNITED STATES PATENT AND TRADEMARK OFFICE
CERTIFICATE OF CORRECTION

PATENT NO. : 5,800,752
DATED     : September 1, 1998
INVENTOR(S) : Raymond Charlebois It is certified that error appears in the above-identified patent and that said Letters Patent is hereby corrected as shown below:

Column 5, line 33, after the word "about", insert --50 psi, preferably greater than about--.
Column 6, line 44, "$Cl_{1-8}$" should read --$C_{1-8}$--.

Signed and Sealed this

Nineteenth Day of January, 1999

Attest:

Attesting Officer

*Acting Commissioner of Patents and Trademarks*